Patented Feb. 3, 1953

2,627,525

UNITED STATES PATENT OFFICE 2,627,525

CONCENTRATION OF METHIONINE IN AMINO ACID MIXTURES

Robert A. Noll, Newport, Ky., and Orville D. Frampton, Wyoming, Ohio, assignors to National Distillers Products Corporation, a corporation of Virginia No Drawing. Application September 27, 1950, Serial No. 187,150

2 Claims. (Cl. 260—529)

1

This invention relates to new and useful improvements in the concentration of methionine.

In the conventional preparation of amino acids from proteins the latter are subjected to hydrolyzation with a suitable acid, usually an aqueous solution of a strong inorganic acid, such as $H_2SO_4$ or HCl. The resultant hydrolysate contains in solution a mixture of the component amino acids which are present by reason of their amphoteric nature in the form of the amino salts of the acids used for hydrolyzation. After suitably filtering the solution to remove therefrom humin and other impurities, the mineral acid is removed by either distillation or precipitation and the free amino group is liberated by suitable neutralization. From this mixture of amino acids, glutamic acid may be separated and recovered.

The separation of glutamic acid from the mixture of amino acids may be obtained in any number of ways conventionally known. It is preferred however to obtain the same in accordance with the procedure described in copending application, Serial No. 52,146, filed September 30, 1948. As there shown, an aqueous concentrate of the calcium salts of protein hydrolysis derived from amino acids and having a solid content of about 50 to 80% by weight, are precipitated with methyl alcohol or a mixture of methyl alcohol and acetone, the latter containing not more than 50% by weight of acetone. The alcohol or alcohol acetone mix is added in amount sufficient to yield about 65–95% of the alcohol or alcohol acetone mix by weight of the total mixture of materials. Upon dissolving the separated precipitate in water and adjusting the pH of the aqueous solution of the precipitate with sulfuric acid to about a pH of 3.2, calcium sulphate is precipitated with a minimum of occlusion of glutamic acid and upon removal of the calcium sulphate and concentrating the resultant aqueous solution to a solids content of about 15–65% by weight, the glutamic acid is obtained in substantially free form. Alternatively, the protein hydrolysate may be processed in some conventional manner to produce monosodium glutamate. In any case, however, where glutamic acid or a glutamate are separated from a protein hydrolysate product a considerable quantity of amino acids are obtained as a by-product in the residual hydrolysate or hydrolysate material. Though these could be worked up to produce a condiment, this has been found undesirable as the composite mixture has usually an astringent taste and is therefore of low marketability.

It has been found, however, that these residual hydrolysates resulting from the processing of distillers' dried grains to produce monosodium glutamate or free glutamic acid possess a relatively large content of methionine, which as such, or in the form of a concentrate, may be used to correct a naturally occurring deficiency in many poultry and livestock feed mixtures.

One object of the invention comprises, among others, the recovery of methionine or of a methionine concentrate from the residual hydrolysate product derived in the processing of distillers' dried grains to produce and separate therefrom glutamic acid or glutamate.

In accordance with the invention a residual hydrolysate material obtained in the glutamic compound separation from protein hydrolysates is reacted while at a solids concentration of about 1–5% by weight, with cuprous chloride at a pH of about 3–4.5, whereupon a precipitate of methionine cuprous chloride complex is formed. The cuprous chloride is provided in amount sufficient to yield 0.25–1 mol equivalent of copper for each mol equivalent of nitrogen in said hydrolysate. Methionine in its free form may then be recovered from the methionine cuprous chloride complex by, for instance, the addition of hydrogen sulphide or a suitable sulphide salt, such as sodium or potassium sulphide, to thereby convert the copper of the methionine copper chloride complex into the insoluble sulphide. The latter may be separated by filtration leaving free methionine in the solution. Methionine may be, as such, recovered from said solution though in most cases it suffices to obtain a suitable concentrate.

When proceeding in accordance with the invention most of the copper not converted into the methionine cuprous chloride complex remains in solution, either as cuprous chloride or as a soluble copper salt of the other amino acids present in the hydrolysate. The above mentioned reaction conditions are critical as otherwise the cuprous chloride methionine complex may not be necessarily obtained in the form of a precipitate and may thus be lost. Any impurities that may be present in the methionine cuprous chloride complex after its separation from its mother liquor may be removed by washing and are primarily due to adhering mother liquor.

Within the preferred embodiment of the invention a pH of about 4, a solids concentration of about 3% by weight and amounts of cuprous chloride sufficient to yield about 0.5 mol equivalents of copper for each mol equivalent of nitrogen in the hydrolysate treated are recommended.

As herein indicated, a suitable protein material that may be used in accordance with the invention is, for example, that conventionally termed "distillers' dry grain." Such distillers' dry grain is the residual product resulting from the starch to alcohol fermentation of grains. It is not intended, however, to limit the process to the use of such material and other suitable proteins or their hydrolysates may be used when containing methionine material as a component thereof.

A convenient source for a suitable hydrolysate that is particularly well adapted to the practice of the process in the instant invention is, for instance, that furnished as hereinabove indicated, in the calcium glutamate precipitation with methyl alcohol of a protein hydrolysate as described in the copending application, Serial No. 52,146, filed September 30, 1948. As hereinabove mentioned and as there disclosed, a suitable hydrolysate is admixed under certain specific conditions with lime slurry and thereafter methanol is added, resulting in the precipitation of calcium glutamate. This methanol filtrate is first freed from its methanol content by distillation and concentrated to the desired solids content. The concentrate thusly obtained may then be treated directly with the cuprous chloride as herein set forth. Alternatively, it is in some cases desirable, particularly where relatively large quantities of methionine are present, to first permit the concentrated filtrate to remain quiescent for a period of time to thereby obtain, by quiescent crystallization, a portion of some of the methionine in the resultant crystal crop. The mother liquor of this crystallization is then treated with the cuprous chloride in accordance with the invention.

Instead of adding cuprous chloride to the residual hydrolysate to be treated in accordance with the invention, it is possible and in many cases of advantage, to prepare the cuprous chloride essentially in situ, such as by adding to the hydrolysate cuprous oxide and concentrated hydrochloric acid.

The following examples are furnished by way of illustration but not of limitation:

Example I

A suitable kettle, preferably adapted to be operated at both atmospheric and above atmospheric pressure, was charged with about 100 pounds of distillers' dried grains containing about 8% moisture. The grain analyzed about 4.2% nitrogen and a calculated glutamic acid content of 5.1%.

About 392 pounds of a mixed acid composed of about 41 pounds of hydrochloric acid (calculated anhydrous), 16.8 pounds of sulfuric acid (calculated anhydrous), and 334.2 pounds of water were used. The kettle charge was refluxed for about 2 hours at atmospheric pressure, and the furfural formed during this operation distilled off. Thereafter, actual hydrolyzation was effected by closing the kettle and heating the contents for about 4 hours at a temperature of about 130° C., whereupon the kettle contents were cooled and filtered for the removal of humins. The filtered acid hydrolysate (about 507 pounds) was then subjected to vacuum distillation at a temperature of about 60° C. for the removal of hydrochloric acid. About 38 pounds of hydrochloric acid (calculated anhydrous) were contained in the distillate and were recoverable therefrom.

The concentrated hydrolysate (about 62.5 pounds) containing residual hydrochloric acid of about 2.1% (calculated anhydrous), was then neutralized to pH 7 with lime slurry with cooling and stirring. The resultant calcium sulfate precipitate was then removed by filtration. The resultant filtrate (about 308 pounds) containing about 4.7 pounds glutamic acid in the form of its calcium salt, was then subjected to vacuum concentration at a temperature of about 60° C. or less, down to about 75.4 pounds, having at that point a solids content of about 45.3 pounds (including the calcium glutamate).

To this concentrate was then added about 279 pounds of absolute methanol, with stirring, resulting in a final methanol concentration of about 90% of the total methanol and water present. The calcium glutamate precipitated upon the addition of the methanol was then removed by filtration and the filter cake washed with about 54 pounds of absolute methanol. The methanol filtrate (about 374 pounds) contained about 33.6 pounds solids, including about 0.48 pounds of glutamic acid in the form of its calcium salt.

Example II 250 litres of a methanol filtrate obtained, for instance, as specified in Example I, and containing about 0.635 kg. methionine and 57.3 kg. solids was concentrated to 61.5% by weight solids and stored for 40 hours. The crystal crop obtained contained about 60% by weight of the original methionine in a purity of about 3.5%. The mother liquor (80 litres) was then treated with 9.8 litres of concentrated hydrochloric acid and 18.5 kg. cuprous oxide and warmed for 2 hours on the water bath. The mixture had a pH of about 4 and was filtered and diluted with 350 litres of water and 100 litres of methanol. The resulting precipitate was then separated by centrifuging. The precipitate was washed with water and thereafter decomposed with hydrogen sulfide and filtered. The filtrate contained 16.2% of the original methionine in a purity of 7.2%. Combining the two methionine concentrates would give a yield of 76% and a purity of 3.9%. The original methionine purity is 1.1%.

Though the foregoing experiment sets forth a pre-crystallization of the first concentrate, it is possible to directly treat the methanol filtrate with cuprous chloride provided the same has the specified solids content of from 1-5% and is at the pH of 3-4.5. It is also possible, and in many cases, better yields are obtained depending upon circumstances, to dispense with the use of methanol.

We claim:

1. In the process of recovering amino acids from protein containing material which comprises hydrolyzing such material with a hydrolyzing acid, thereby producing a mixture of amino acids, thereafter selectively separating the glutamic acid from such mixture, thereby producing a residue of the remaining amino acids, the improved method of concentrating methionine from such residue comprising contacting such residue at a solids concentration of from 1-5% and at a pH of from 3-4.5 with cuprous chloride in amount sufficient to yield 0.25 to 1.0 mol of copper for each mol of nitrogen present, thereby producing a copper methionine precipitate, separating such precipitate and recovering methionine therefrom.

2. Improvement in accordance with claim 1 in which said solid concentration is about 3%, said pH is about 4 and said cuprous chloride is added in amount sufficient to yield about 0.5 mol of copper for each mol of nitrogen present in said residue.

ROBERT A. NOLL.
ORVILLE D. FRAMPTON.

REFERENCES CITED

The following references are of record in the file of this patent:

UNITED STATES PATENTS

| Number | Name | Date |
|---|---|---|
| 2,376,186 | Rapkine | May 15, 1945 |
| 2,414,303 | Holloway et al. | Jan. 14, 1947 |
| 2,462,124 | Neuberg et al. | Feb. 22, 1949 |

OTHER REFERENCES

Pirie: Biochem. J., vol. 26, pp. 1270–1274 (1932).

Cunningham et al.: Chem. Abstr., vol. 31, col. 4357 (1937).